United States Patent [19]

Preysman

[11] Patent Number: 4,695,982

[45] Date of Patent: Sep. 22, 1987

[54] HUB HOLE CHARACTERIZATION SYSTEM

[75] Inventor: Vladimir Preysman, Santa Clara, Calif.

[73] Assignee: Verbatim Corporation, Sunnyvale, Calif.

[21] Appl. No.: 754,543

[22] Filed: Jul. 12, 1985

[51] Int. Cl.⁴ ............... G06F 15/46; G06F 15/70; G01B 21/30

[52] U.S. Cl. .................... 364/506; 33/504; 356/376; 358/107; 364/560

[58] Field of Search ........... 364/550, 506, 551, 560, 364/561, 521; 358/106, 107; 356/358, 376, 380, 384, 385, 386; 33/174 Q, 174 L

[56] References Cited

U.S. PATENT DOCUMENTS

| | | | |
|---|---|---|---|
| 3,846,916 | 11/1974 | Moriya et al. | 33/174 Q |
| 3,911,257 | 10/1975 | Whitehouse et al. | 33/174 Q |
| 4,070,762 | 1/1978 | Siddall | 33/174 Q |
| 4,184,263 | 1/1980 | Tatsumi et al. | 33/174 Q |
| 4,201,476 | 5/1980 | Musto et al. | 356/386 |
| 4,296,474 | 10/1981 | Hurt | 364/560 |
| 4,334,276 | 6/1982 | Turnbull | 364/561 |
| 4,342,091 | 7/1982 | Whitehouse et al. | 364/506 |
| 4,379,308 | 4/1983 | Kosmowski et al. | 358/106 |
| 4,485,453 | 11/1984 | Taylor | 364/560 X |

Primary Examiner—Felix D. Gruber
Attorney, Agent, or Firm—Dennis P. Monteith

[57] ABSTRACT

A method and apparatus for characterizing a central circular aperture of a workpiece, for example a flexible information storage disk. The apparatus utilizes a non-contact sensor system having a rotary stage upon which the workpiece is placed. A reference edge extending approximately to the axis of rotation of the stage serves as a reference point from which a laser beam measures a plurality of radial distances extending from the reference edge to a plurality of points about the disk's central aperture. A computer utilizes these distances along with a known deviation of the reference edge from the center of rotation of the stage to construct a shape comprising a plurality of inscribed triangles. The center of the shape is found by mathematically determining its center of gravity. The center of gravity is then used to locate a reference coordinate system and precise reference circles are drawn around the center of gravity. The size and shape of the disk central aperture is then plotted based on the deviation of the aforementioned shape from the reference circles.

6 Claims, 6 Drawing Figures

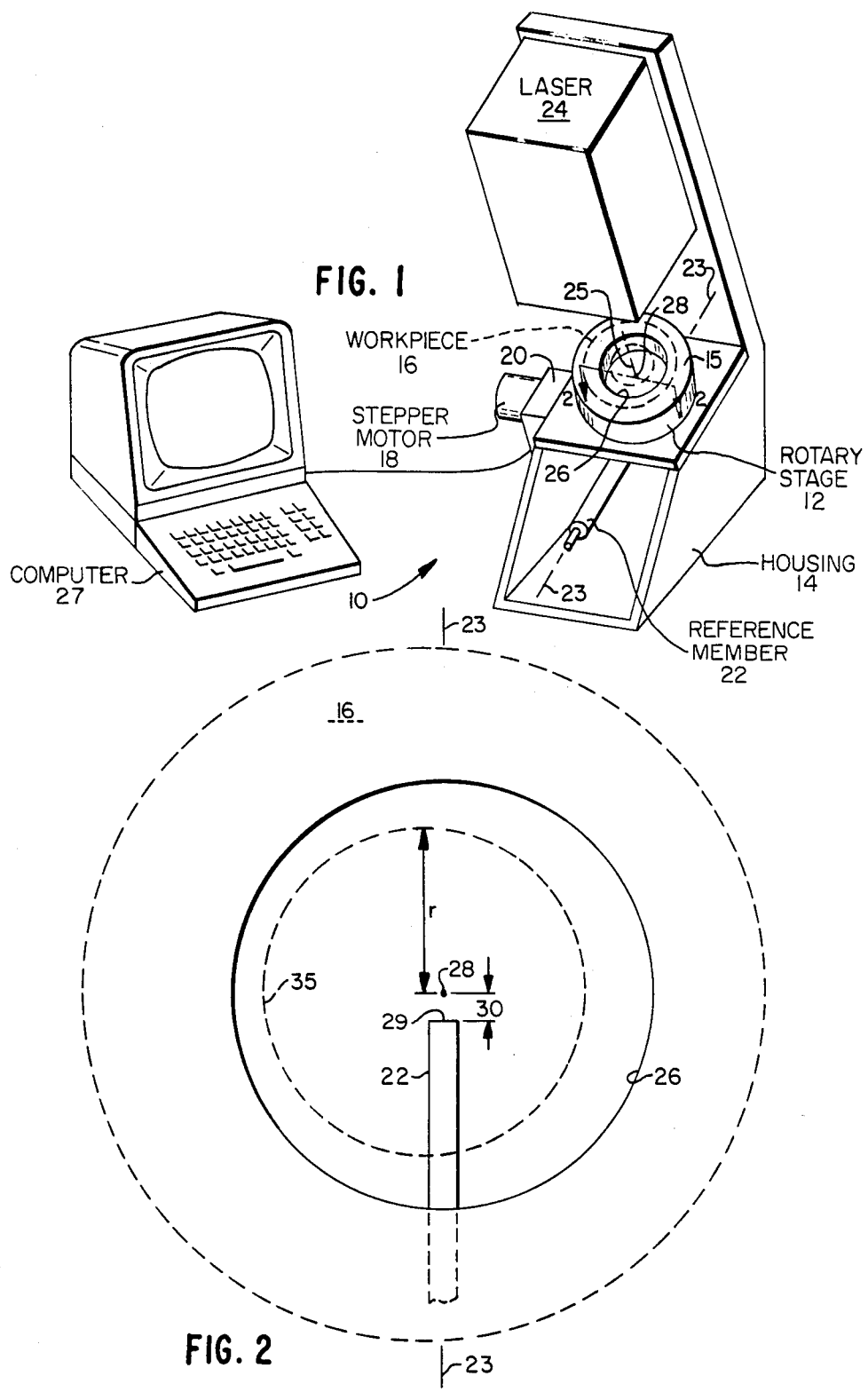

HUB HOLE CHARACTERIZATION SYSTEM

BACKGROUND OF INVENTION

A microfiche appendix comprising 30 frames contained on one fiche is part of this application and is on file with the Patent and Trademark Office.

FIELD OF THE INVENTION

The present invention relates to a method and apparatus for measuring roundness of a workpiece and, more particularly, to a non-contact digital means of characterizing roundness of a workpiece.

DESCRIPTION OF THE PRIOR ART

Various apparatus and methods are known in the art for measuring roundness of a workpiece. Roundness information is of particular importance in the manufacturing and quality control of flexible magnetic information storage disks. Such disks are typically clamped in a disk drive mechanism by a plurality of mechanical fingers which expand within the disk hub hole to secure the disk. The expansion of the fingers is limited by a cylinder which is just slightly larger than the disk hub hole. Disks which possess oversize hub holes will be clamped too loosely, and disks with undersize hub holes may be stretched and deformed by the clamping mechanisms. In either case, signal strength may be decreased or lost due to the misclamping.

Imprecisely shaped holes may also appear during disk manufacture. For example, holes that are not perfectly round but are instead slightly oblong typically occur and have two stable slamping positions at either end of the oblong hole, and a plurality of unstable positions therebetween. Such holes can result in inconsistent clamping, randomly yielding acceptable and unacceptable clamping. The prevalent prior art device to measure roundness of a workpiece and specifically roundness of a disk hub hole is a precision metal cone gauge, for example, those sold under the trademark Dymek. This gauge is a very slightly tapered cone over which a disk may be placed. The disk hub hole size is estimated by the disk's position on the gauge. This method, however, really measures only the smallest size of hole and does not provide information relative to roundness. Further, being a mechanical method, the gauge may bend microprotrusions within the hub hole out of the way, thus yielding erroneous results.

Other devices known in the art which may be adaptable to measure roundness of a workpiece include those disclosed in U.S. Pat. Nos. 4,342,091 issued to Whitehouse et al., 4,184,263 issued to Tatsumi et al.; 4,070,762 issued to Siddall; 3,911,257 issued to Whitehouse et al.; and 3,846,916 issued to Moriya et al. These inventions all utilize contact sensors which would bend a flexible information storage disk and distort measurements thereof. Further, these inventions are designed to process signals received from the sensor in analog form, then filter the signal to separate a displacement signal from a roughness signal. While all of these references mention centering the workpiece, none is specific as to what this means and how it should be done. It can be appreciated that centering is truly applicable only to a perfectly round object, whereas the purpose of the inventions disclosed in each of these references is to measure roundness of an object which must be imperfect, therefore the methods are inherently imperfect. Finally, only Siddall addresses the requirements of aligning the position sensor to be coincident with a radial line, and calibration of the roundness measurement. Neither Siddall nor any of the other cited references elaborates on how the radial line measurement is obtained, and the calibration techniques employed generally do not utilize multiple measurements, thus they are inherently imprecise. Also, none of the prior art can effectively characterize a hub hole; i.e., provide information as to its exact size and shape. Finally, being complex mechanical devices, it is unlikely that any of the prior art devices are highly accurate.

SUMMARY OF THE INVENTION

Accordingly, it is an object of the present invention to provide a method for charcterizing roundness of a workpiece.

It is a further object of the present invention to provide a roundness characterizing means utilizing a non-contact sensor.

It is a further object of the present invention to provide a roundness measuring means which does not require alignment of a workpiece with a center of rotation of the measuring means.

It is a further object of the present invention to provide a roundness measuring means which provides information in digital form, stores a plurality of measurements and processes them mathematically to analyze workpiece size and shape.

It is a further object of the present invention to provide a workpiece measuring method which is highly accurate.

It is yet another object of the present invention to provide a workpiece roundness measuring method which is easy to calibrate and which may be calibrated to a high degree of accuracy.

It is a further object of the present invention to provide a workpiece roundness measuring method which is very rapid and can automatically take the required readings within a few minutes.

Briefly, a preferred embodiment of the present invention includes a rotary stage having a central aperture larger than a disk hub hole. The stage is rotated by a stepper motor and can be rotated in increments of four hundredths degrees each. Precisely located about a radial line passing through a center of rotation of the stage is a fixed mechanical micrometer which extends approximately to the center of rotation of the stage. A laser beam is swept across the radial line and a radial distance from an edge of the hub hole to the micrometer as measured by the time duration that the light is received by a photodetector. A computer is used to coordinate each radial distance with the corresponding angular position of the disk and calculates a center of the disk using a center of gravity construction. The computer then calculates coordinates representative of a reference circle having a center at the center of gravity and computes the difference between corresponding coordinates of the reference circle and the disk, such difference characterizing the size and the shape of the disk hub hole.

A method of the present invention includes placing a disk on the stage and taking a plurality of radial measurements, typically from sixteen to three hundred and sixty, at the incremental angular positions of the stage. The measurements are stored in the computer and processed simultaneously to yield a plot of the difference between the circumferential edge of the hub hole and the circumferential edge of the reference circle.

It is an advantage of the present invention that a workpiece roundness can be characterized, not just measured.

It is a further object of the present invention that non-contact sensor means are employed.

It is another object of the present invention that alignment is simple and accurate, and there is no requirement of aligning the workpiece with a center of rotation of the measuring means.

It is yet another advantage of the present invention that measurements are taken in digital form and stored to be simultaneously processed upon completion of the desired number of measurements.

It is a further advantage of the present invention that it is highly accurate.

It is another advantage of the present invention that accurate readings may be taken in a few minutes.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of the apparatus of the present invention;

FIG. 2 is a detailed schematic illustration taken along line 2—2 of FIG. 1;

DETAILED DESCRIPTION OF THE PREFERRED EMBODIMENT

Figure 3:
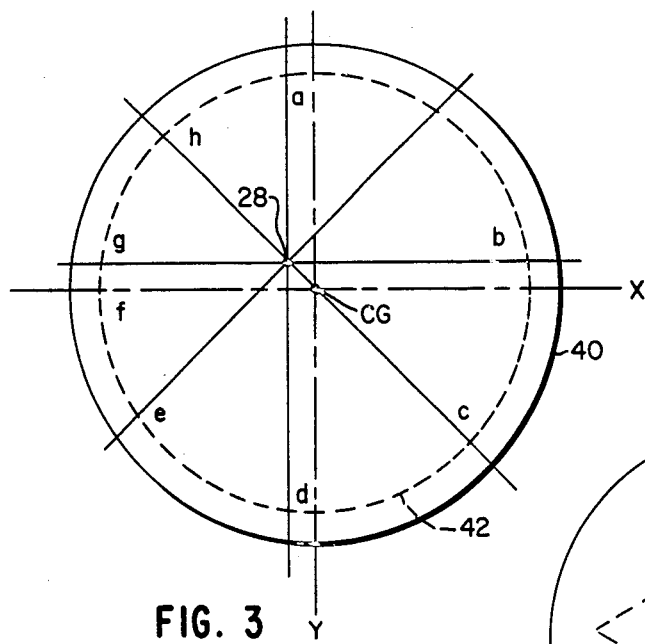
FIG. 3 is a schematic illustration of the center of gravity determination method of the present invention.

FIG. 1 illustrates a roundness characterization system of the present invention and referred to by the general reference character 10. The system 10 includes a rotary state 12 mounted on a housing 14. The rotary stage 12 may include a magnetic surface 15 to aid in securing a workpiece 16 (illustrated in phantom) to the stage 12. While the system 10 can be utilized to characterize roundness of a variety of workpieces 16, the preferred workpiece 16 for which the system 10 is designed is a flexible magnetic information storage disk. The stage 12 is rotatably driven by a stepper motor 18 through suitable gearing 20. Mounted below the stage 12 is a reference member 22 which extends from a fixed known distance along a radial line 23 passing through a center of rotation 28 of the stage 12, shown also in FIG. 2, which illustrates the workpiece 16 positioned on the stage 12 and misaligned from the center or axis of rotation 28 by an exaggerated amount. The system 10 further includes a noncontact detection means comprising a laser light source 24, mounted to the housing 14 such that a beam 25 is directed through a central aperture 26 of the stage 12, and a microcomputer 27. While a variety of types of computers of microcomputers can be employed as the computer 27, in the apparatus 10 a Hewlett-Packard 9816 computer is selected. The beam 25 is directed perpendicularly across the stage 12 at a rate of one hundred scans per second by means of an oscillating mirror and lens system (not shown).

A radial distance, "r", from the end 29 of the reference member 22 to a corresponding edge of a hub hole 35 of the workpiece 16, as illustrated in FIG. 2, is determined by measuring a time duration of the beam 25 as it is swept between the end 29 and the hub hole 35. Such determination is made using photodetector means and a microprocessor (not shown) as is known in the art. To ensure readings about a plurality of points on a circumference of the hub hole 35, the aperture 26 must be larger than the hub hole 35.

A plurality of such distances are measured as the stepper motor 18 incrementally rotates the stage 12. Each radius is stored in the computer 27 as a digital value, and is paired with its corresponding angular position of the stage 12 to yield a plurality of coordinates in polar form. In the system 10, there are only two limitations on the number of radial measurements taken. The first of these is that the stepper motor 18 moves in steps of about four hundredths (0.04) degrees each. The second is that the computer 27 has a memory capacity for a maximum of eighteen hundred points, which translates to a reading every two-tenths (0.2) of a degree. It is apparent that depending on the stepper motor 18 and the computer 27, these values may be altered to allow for a greater number of points or to further restrict the number that can be measured. In practical applications of the system 10, these values are not approached as typically between sixteen and three hundred and sixty angular positions are measured.

It is to be noted that the reference member 22 is simply a physical means of interrupting the beam 25 such that a distance from a known point can be measured. The member 22 accordingly may be any accurate means of interrupting the beam 25, and may be mounted above or below the stage 12. In the system 10, the preferred implementation of the reference member 22 is a micrometer, mounted below the stage 12. It may also be noted that while a rotating stage 12 has been described, the stage 12 may be fixed and the distance measuring means and reference points rotated instead. Further, the stage 12 may be other than a rotary stage, for example, an X-Y stage. The only limitation is that a plurality of distances measured from the end 29 of reference member 22 to an edge of the hub hole 35 are acquired. Furthermore, while the noncontact detection means has been described in terms of the laser light source 25, other suitably accurate light sources may be employed as may other noncontact detection means known in the art, for example, a precision camera, which can accurately measure a distance between two physical objects. Even a contact sensor can be employed as long as the data is stored in digital form and analyzed in accordance with the method of the present invention.

Figure 6:
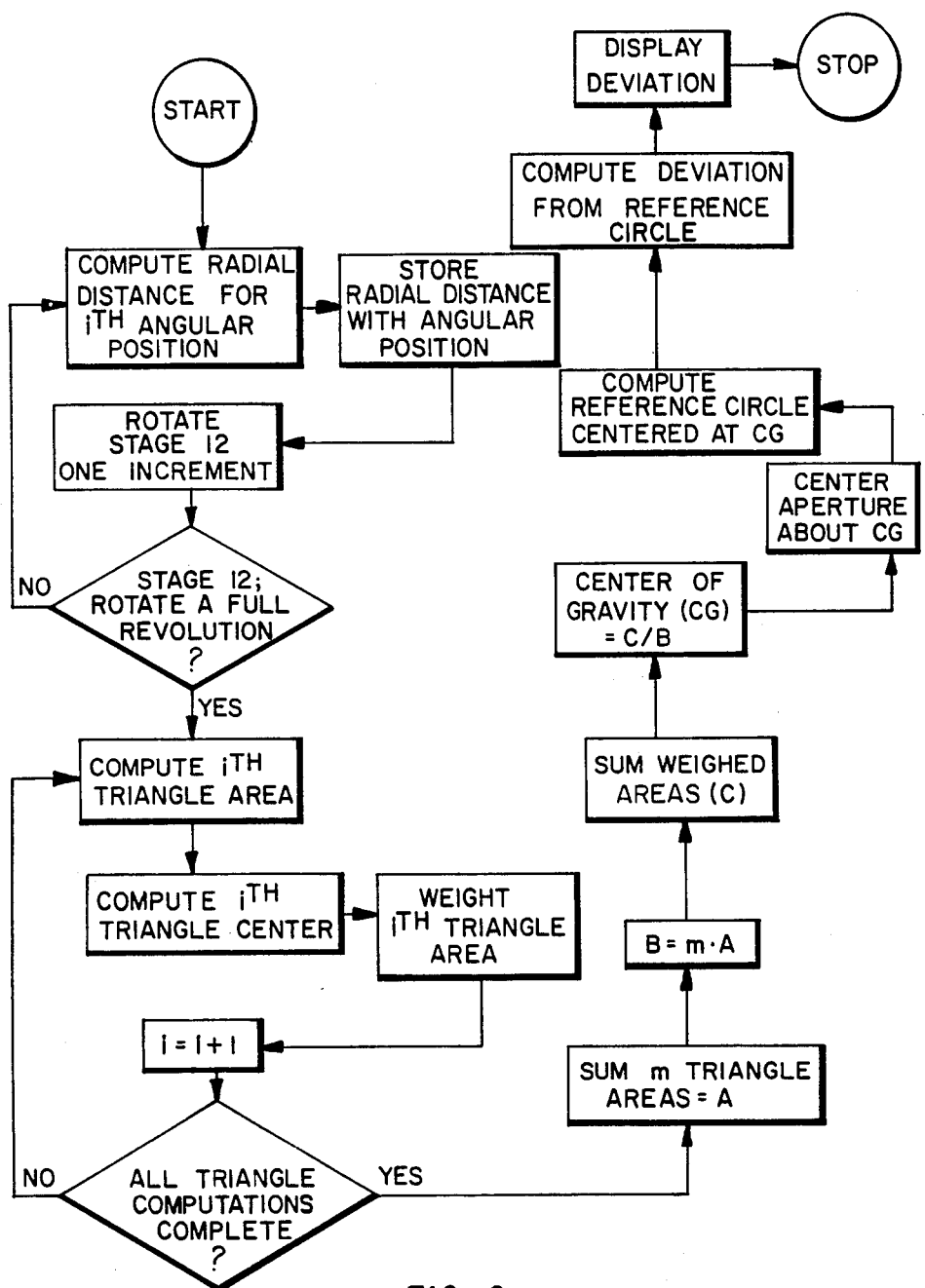
FIG. 6 is a flowchart useful in explaining the method, in accordance with the invention, for characterizing the roundness of a workpiece aperture.

FIGS. 2, 3 and 6 schematically illustrate the method by which a hub hole measurement is made. A plurality of radial measurements are taken from the aforementioned end 29 which, in the system 10 comprises an inner flat surface of the reference member 22 (shown in FIG. 2), to an edge of a workpiece hub hole 35. These plurality of measurements are transformed to radii by subtracting the distance, denoted 30, between the surface 29 of the reference member 22 and the center of rotation 28 of the stage 12 and these radii result in a plurality of inscribed triangles, designated "a" through "h" in FIG. 3. The plurality of inscribed triangles of FIG. 3 are collectively referred to as a shape 40. In order to construct a center of the two-dimensional shape 40, the computer 27 is given measurement from the center of rotation 28 of the stage 12 to the surface 29 of the reference member 22, designated by the letter 30 in FIG. 2.

To develop the coordinate system, the distance 30 must be found. The distance 30 is subtracted from each radial measurement to yield a radius "r" for the polar coordinate point. Each radius "r" of the shape is determined from the formula: "r"=measured reading minus the distance 30. To find the distance 30, a standard ring gauge (not shown) of a known radius is placed on the stage 12 and radius measurements are made. The gauge is certified by a National Bureau of Standards traceable lab to be accurate to forty millionths of an inch. By knowing the exact radius of the gauge, the resulting measured radius is inaccurate by the amount of the distance 30. This distance 30 is then used to compute the radii for the unknown hub hole 35. The angular component for the polar coordinate system is found by knowing the deviation in degrees of each point from the previous point as the stage 12 is rotated by the stepper motor 18. The initial value is set at ninety degrees so that the orientation of the workpiece 16 hub hole will be the same as the resulting plot displayed by the computer 27. The rectangular coordinates are simply the algebraic manipulation of the polar coordinates, i.e.:

X coordinate=radius×cos. (angle), and
Y coordinate=radius×sin. (angle), where radius=(angular reading) minus distance 30; and
angle=90+(i−1)×(degrees per step)

as i goes from one to the number of steps taken.

From these measurements, the computer 27 can plot a deviation from reference circle 42, shown in FIG. 3. In order to do this, the computer 27 must decide where a center of this reference circle 42 resides with respect to the shape 40 of FIG. 3. Once this is computed, the computer 27 subtracts the coordinates representative of the reference circle 42 from the corresponding coordinates of the shape 40 to obtain the difference or deviation between the two; the computer then plots this deviation of the shape 40 from the reference circle 42. In order to carry out these computations, the computer 27 utilizes a center of gravity computation to determine a center of the shape 40. The center of gravity of a two-dimensional shape takes into account the area between the points defining the shape; i.e., in the shape 40, the areas of triangles defined by the points 28 and "a" through "h". By increasing the number of measurements, resulting in a greater number of inscribed triangles, the center of gravity can be determined with more accuracy. Once the center of gravity is determined, the points defining the shape 40 can be translated to an X and Y axis whose origin is the center of gravity, designated CG, and the reference circle 42 (shown by the broken line) is constructed around the center of gravity. This is illustrated in FIG. 3.

The plot of the reference circle 42 must be centered with respect to the shape 40 for two reasons; first, so that it will be easy to compare two reference circles indicating the ideal inner and outer limits, and second, so that in computing the difference between the reference circle 42 and the shape 40, the hub hole 35 can be represented by a positive deviation around its entire edge. The circle 42 has its center at the center of gravity of the shape 40. The center of gravity of the shape 40 is found by splitting the shape 40 into the series of inscribed triangles having a common apex at the center of the original coordinate system (i.e. the point 28), taking the center of gravity of each triangle and weighting these centers of gravity by the areas of the respective triangles. The center of gravity of each triangle is determined by an intersection of two straight lines, each line extending from the midpoint of the radial distance defining one side of the triangle to the circumferential endpoint of the radial distance defining the opposite side of the triangle.

Once the center of gravity of each triangle is found, the center of gravity of the shape 40 is determined by multiplying the area of each triangle by its center of gravity, to obtain a weighted value for each triangle. The individual weighted values for all triangles are summed to obtain a cumulative value and then averaging this cumulative value by dividing it by the product of the total number of triangles times the area of the shape 40, which is determined by summing the respective areas of the individual triangles. It is to be noted that a center of gravity is simply a mathematical determination of a "midpoint" of a figure other than a line. Numerous methods of computing a center of gravity of a geometrical shape are known in the art and are equally applicable to the method of the present invention. Further, because the center of gravity computations allow for measuring and storing a plurality of radii, and calculating the center of gravity from the stored data points, there is no requirement of centering the disk hub hole 35 over the center of rotation 28. All that is required is that a periphery of the hub hole 35 be within a periphery of the stage aperture 26 so that the plurality of radii can be measured.

Figure 4:
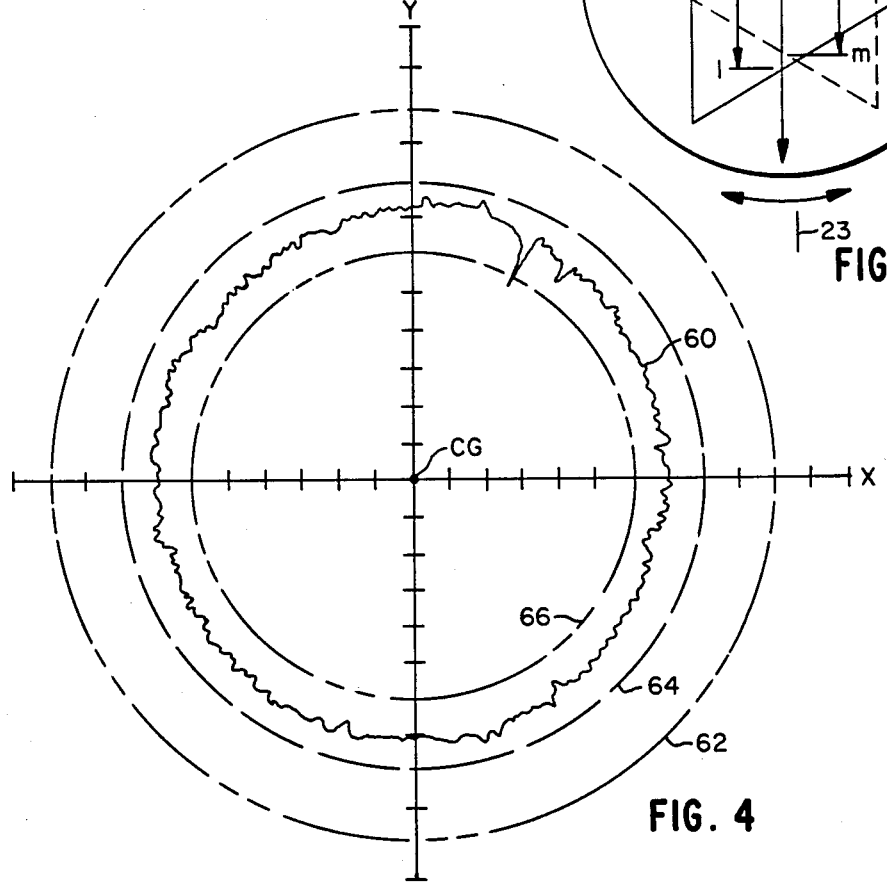
FIG. 4 is a graph produced by the method of the present invention.

The final plot, shown in FIG. 4, is a representation of the deviation of the shape 40 from a known circle, e.g. the circle 42. The reference circle 42 is chosen to be large enough to amplify the deviations of the shape 40 therefrom, yet small enough so it will not overlap the shape 40 and yield negative deviations. In this way, changes in the area of one hundred millionths of an inch will be visible on the plot. For three sizes of floppy disks (i.e., three-and-a-half-inch, five-and-a-quarter-inch, and eight-inch), the reference circles 42 that are compared with the shape 40 are of the following diameters:

| Disk Size (in inches) | Hub Hole Diameter (in inches) | Reference Circle 42 Diameter (in inches) |
| --- | --- | --- |
| 3.5 | .990 | .960 |
| 5.25 | 1.125 | 1.121 |
| 8 | 1.500 | 1.496 |

The diameter of the corresponding reference circle 42 is printed at the origin of the axis on the final plot. This illustrates that the distance to each point on the plot is actually the deviation of the original shape 40 from the edge of the reference circle 42. A center of the reference circle 42 resides on the origin that was found by calculating the center of gravity ("CG"), as previously described. Once the coordinate axes are translated to the center of gravity, the X and Y values of each point, hence the radii, are found using the right triangle theorem, i.e., Radius (r)=the square root of $X^2+Y^2$. From this, the reference circle radius is subtracted from the radii of each point, resulting in new X and Y coordinate values. Along with this computation, the original radii are summed and an average is found. Two times this average radii is displayed on the final plot. The value of twice the radius is chosen to provide a comparison value to a circle diameter, which is an industry standard. A diameter, however, is not being measured by the system 10, nor is a diameter truely applicable to a shape which is not perfectly round. Hence, twice the radius provides analogous, meaningful information based on the measurements taken.

FIG. 4 illustrates an example of a final plot wherein the points, comprising radial deviations from the reference circle 42 are plotted and connected, creating the completed shape 60. Three reference circles, comprising an outside limit 62, an ideal circle 64 and an inside limit 66 are also displayed on the plot of FIG. 4. The actual plot may also display a number of points taken, the number of degrees between adjacent points and the average radius times two. While the system 10 has the capability of displaying the plot on a screen of the computer 27 and as a hard copy, either alone will suffice as will any means known for producing a graphical result. The plot of FIG. 4 illustrates deviations as little as fifty microinches from a perfect circle.

To accurately characterize a workpiece aperture, the system 10 must first be aligned. Only one alignment step need be performed. This involves aligning the stage 12 so that the laser beam 25 passes through the center of rotation 28 of the stage 12. The alignment step must be performed prior to calibration or measurement to ensure accuracy.

Figure 5:
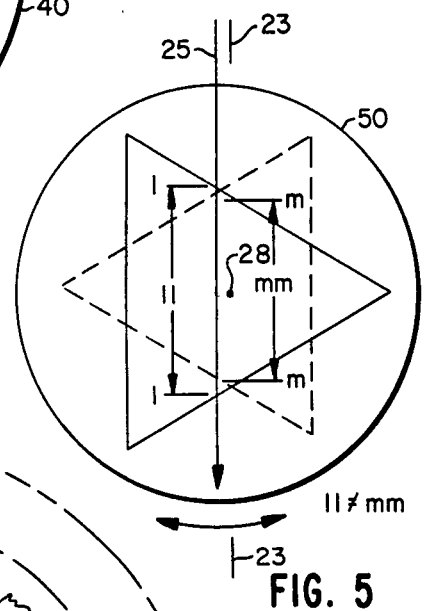
FIG. 5 is a schematic illustration of the radial alignment means of the present invention.

A deviation of the beam 25 from the center of rotation 28 (and also from the coincident line 23) is determined by removing the reference member 22 and placing a triangular gauge block 50 on the stage 12 approximately over the center of rotation 28 as illustrated in FIG. 5. The beam 25 will cross the gauge block 50 and describe a line mm. The stage is then rotated by one hundred eighty degrees (with the gauge 50 represented by the broken line) and a second reading is taken describing a line 11. If the lines mm and 11 exactly coincide, as determined by identical lengths of the lines, the beam 25 will be precisely on the center of rotation 28 of the stage 12. Any discrepancy in the position of the beam 25 relative to the center of rotation 28 of the stage 12 equals a deviation from the coincident line 23 and the stage is physically relocated accordingly, either manually or automatically by the computer 27. FIG. 5 illustrates such a discrepancy where 11 does not equal mm, hence the beam 25 is not perfectly aligned with the center of rotation 28.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. Apparatus for characterizing the roundness of a workpiece aperture, said apparatus comprising:
   (a) a rotary stage adapted to receive a workpiece having an aperture to be characterized, said rotary stage including a central aperture surrounding the workpiece aperture;
   (b) a reference surface mounted to provide a fixed radial reference point approximately at the axis of rotation of said rotary stage;
   (c) movement means for incrementally rotating said rotary stage, to rotate the workpiece in a stepwise manner around the fixed radial reference point;
   (d) a non-contact detection means for measuring a radial distance associated with each angular position of the workpiece, each radial distance extending along a predetermined radial path between the fixed radial reference point and the corresponding periphery of the workpiece aperture; and
   (e) programmable computer means, in communication with said movement means and having an input for receiving a signal from said detection means corresponding to each radial distance that is measured, said computer means being adapted to coordinate each radial distance with the corresponding angular position of the workpiece, to characterize the size and the shape of the workpiece aperture.

2. A method for characterizing the roundness of a workpiece aperture comprising:
   (a) placing the workpiece on a rotatable receiving surface;
   (b) incrementally rotating the receiving surface, to rotate the workpiece in a stepwise manner around the center of the receiving surface;
   (c) measuring, for each angular position of the workpiece, a radial distance extending along a predetermined radial path, through a fixed predetermined reference point relative to the center of the receiving surface to the corresponding periphery of the workpiece aperture; and
   (d) coordinating each radial distance that is measured with the corresponding angular position of the workpiece, to compute a plurality of angularly distributed peripheral points which together define the size and the shape of the workpiece aperture.

3. The method as defined in claim 2 further comprising:
   (a) defining a two-dimensional shape the periphery of which is comprised of segments connecting the immediately adjacent angularly distributed peripheral points computed respectively from the radial distances measured at each angular position of the workpiece;
   (b) calculating a center of gravity of the two-dimensional shape;
   (c) defining a reference circle the center of which coincides with the center of gravity of the two-dimensional shape; and
   (d) comparing coordinate values representing the reference circle with corresponding coordinate values representing the two-dimensional shape to determine point-by-point the difference between the two-dimensional shape and the reference circle whereby the workpiece aperture is characterized with respect to the amount by which each point defining the two-dimensional shape deviates from the corresponding point of the reference circle.

4. The method of claim 2 wherein:
   each radial distance is measured using a non-contact laser micrometer means;

5. The method of claim 2 wherein:
   said rotatable receiving surface is rotated by means of a stepper motor.

6. The method of claim 3 wherein the center of gravity of the two-dimensional shape is computed by:
   (a) defining a plurality of triangles inscribed within the two-dimensional shape, the periphery of each triangle being defined respectively on a first side by a corresponding peripheral segment and on the other two sides by immediately adjacent radial distances;

(b) determining a center of gravity for each inscribed triangle;

(c) computing a weighted area for each triangle by multiplying its area by its center of gravity; and (d) computing the center of gravity of the two-dimensional shape by dividing the sum of the weighted areas for all inscribed triangles by the product of the number of inscribed triangles and the sum of the actual areas of all triangles.

* * * * *

UNITED STATES PATENT OFFICE
CERTIFICATE OF CORRECTION

PATENT NO. : 4,695,982
DATED : September 22, 1987
INVENTOR(S) : Vladimir Preysman It is certified that error appears in the above-identified patent and that said Letters Patent are hereby corrected as shown below:

Column 1, line 33    "slamping" should be ---clamping---

Column 3, line 65    "of microcomputers" should be ---or microcomputers---

Column 7, line 14    "a number" should be ---the number---

Signed and Sealed this

First Day of March, 1988

Attest:

Attesting Officer

DONALD J. QUIGG

Commissioner of Patents and Trademarks